(12) United States Patent
Boyce et al.

(10) Patent No.: US 11,756,153 B2
(45) Date of Patent: Sep. 12, 2023

(54) HEMISPHERE CUBE MAP PROJECTION FORMAT IN IMAGING ENVIRONMENTS

(71) Applicant: Intel Corporation, Santa Clara, CA (US)

(72) Inventors: Jill Boyce, Portland, OR (US); Maxym Dmytrychenko, Munich BY (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/415,689

(22) Filed: May 17, 2019

(65) Prior Publication Data

US 2019/0272618 A1      Sep. 5, 2019

Related U.S. Application Data

(60) Provisional application No. 62/787,156, filed on Dec. 31, 2018.

(51) Int. Cl.
*G06T 3/00*     (2006.01)
*H04N 23/698*   (2023.01)

(52) U.S. Cl.
CPC .......... *G06T 3/0062* (2013.01); *G06T 3/0087* (2013.01); *H04N 23/698* (2023.01)

(58) Field of Classification Search
None
See application file for complete search history.

(56) References Cited

U.S. PATENT DOCUMENTS

| 2018/0025467 | A1* | 1/2018 | Macmillan | G06T 15/20 |
| | | | | 382/190 |
| 2018/0157455 | A1* | 6/2018 | Troy | G06F 3/04842 |
| 2018/0342098 | A1* | 11/2018 | Chang | G06T 15/04 |
| 2019/0026858 | A1* | 1/2019 | Lin | H04N 19/55 |
| 2019/0188828 | A1* | 6/2019 | Aggarwal | G06T 15/04 |
| 2019/0215532 | A1* | 7/2019 | He | G06T 17/30 |

FOREIGN PATENT DOCUMENTS

CN      111383167 A      7/2020

OTHER PUBLICATIONS

Ye, Y. et al., "Algorithm descriptions of projection format conversion and video quality metrics in 360Lib Version 5", Oct. 2017, JVET-K1004, 46 pages.
ITU-T H.265, "High Efficiency Video Coding (Feb. 2018)," https://www.itu.int/rec/T-REC-H.265-201802-I/en, 692 pages.

* cited by examiner

*Primary Examiner* — Aaron M Richer
(74) *Attorney, Agent, or Firm* — HANLEY, FLIGHT & ZIMMERMAN, LLC

(57) ABSTRACT

A mechanism is described for facilitating hemisphere cube map projection format imaging environments, according to one embodiment. A method of embodiments, as described herein, includes capturing, by a camera coupled to one or more processors, an image having image content, wherein the image content being represented by the image is omni-directional such that the image content is mapped on a sphere while representing less than the sphere; mapping the image to a cubic representation based on six faces of a cube, wherein one or more of the six faces are classified as inactive regions such that they remain unoccupied or partially occupied; and arranging, based on the cubic representation, the six faces in a compact representation by avoiding inclusion of the inactive regions.

17 Claims, 17 Drawing Sheets

HEMISPHERE CUBE MAP PROJECTION FORMAT IN IMAGING ENVIRONMENTS

RELATED APPLICATION

This application claims the benefit and priority to U.S. Provisional Application No. 62/787,156, entitled HEMISPHERE CUBE MAP PROJECTION FORMAT, by Jill Boyce, et al., filed Dec. 31, 2018, the entire contents of which are incorporated herein by reference.

FIELD

Embodiments described herein relate generally to data processing and more particularly to facilitate hemisphere cube map projection format imaging environments.

BACKGROUND

Conventional techniques are not known for defining cube map projection (CMP) formats for hemisphere omnidirectional contents. Such conventional techniques for cube map layouts are often inefficient and easily corrupted.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for facilitating hemisphere cube map projection format representing hemisphere 180°×180° omnidirectional images or videos, such as those captured by a single fisheye lens, so that they may then be coded efficiently using existing images or video codecs. This projection format may be described in a supplemental enhancement information (SEI) message for inclusion in a video coding standard, such as high efficiency video coding (HEVC).

Figure 1:
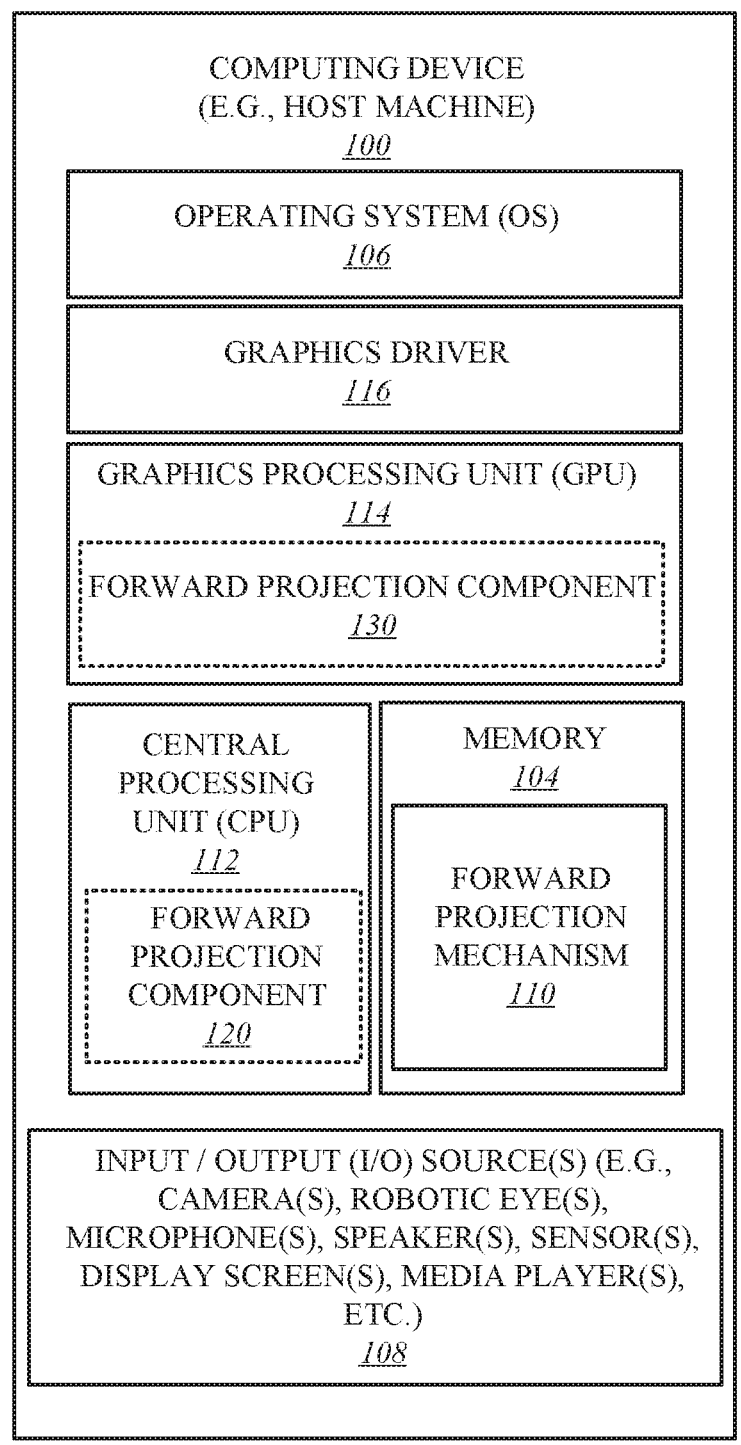
FIG. 1 illustrates a computing device employing a forward projection mechanism according to one embodiment.

FIG. 1 illustrates a computing device 100 employing a forward projection mechanism 110 according to one embodiment. Computing device 100 represents a communication and data processing device including or representing (without limitation) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted displays (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip. For example, computing device 100 comprises a data processing device having one or more processors including (but not limited to) central processing unit 112 and graphics processing unit 114 that are co-located on a common semiconductor package.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, and/or the like, as well as input/output (I/O) source(s) 108, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, any configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). Terms like "logic", "module", "component", "engine", "circuitry", "element", and "mechanism" may include, by way of example, software, hardware, firmware, and/or a combination thereof.

In one embodiment, as illustrated, forward projection mechanism 110 may be hosted by memory 104 in communication with I/O source(s) 108, such as microphones, speakers, etc., of computing device 100. In another embodiment, forward projection mechanism 110 may be part of or hosted by operating system 106. In yet another embodiment, forward projection mechanism 110 may be hosted or facilitated by graphics driver 116. In yet another embodiment, forward projection mechanism 110 may be hosted by or part of graphics processing unit ("GPU" or simply graphics processor") 114 or firmware of graphics processor 114; for example, forward projection mechanism 110 may be embedded in or implemented as part of the processing hardware of graphics processor 114 in the form of misuse assessment component 130. Similarly, in yet another embodiment, forward projection mechanism 110 may be hosted by or part of central processing unit ("CPU" or simply "application processor") 112; for example, forward projection mechanism 110 may be embedded in or implemented as part of the processing hardware of application processor 112 in the form of misuse assessment component 120.

For example, forward projection components 120, 130 and/or any elements of forward projection mechanism 110 may be implemented by one or more analog or digital circuits, logic circuits, programmable processors, programmable controllers, GPUs, digital signal processors (DSPs), application specific integrated circuits (ASICs), programmable logic devices (PLDs), and/or field programmable logic devices (FPLDs).

It is contemplated that this novel technique is not limited to a software implementation or a hardware implementation and, as will be further described in this document, this novel technique may be applied and implemented in software, hardware, firmware, or any combination thereof. It is, therefore, further contemplated that embodiments are not limited to certain implementation or hosting of forward projection mechanism 110 and that one or more portions or components of forward projection mechanism 110 may be employed or implemented as hardware, software, firmware, or any combination thereof. Further, as used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events Computing device 100 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, a data processing machine, a data processing device, network of computers, or other electronic devices, may result in the one or more machines carrying out operations in accordance with embodiments described herein. As described with reference to FIG. 1, a machine may include one or more processors, such as a CPU, a GPU, etc. A machine-readable medium may include, but is not limited to, floppy diskettes, optical disks, Compact Disc-Read Only Memories (CD-ROMs), magneto-optical disks, ROMs, Random Access Memories (RAMs), Erasable Programmable Read Only Memories (EPROMs), Electrically Erasable Programmable Read Only Memories (EEPROMs), magnetic or optical cards, flash memory, or other type of media/machine-readable medium suitable for storing machine-executable instructions.

For example, when reading any of the apparatus, method, or system claims of this patent to cover a purely software and/or firmware implementation, at least one element of forward projection components 120, 130 and/or forward projection mechanism 110 may be expressly defined to include a non-transitory computer readable storage device or storage disk such as a memory, a digital versatile disk (DVD), a compact disk (CD), a Blu-ray disk, etc., including the software and/or firmware.

Moreover, one or more elements of forward projection components 120, 130 and/or forward projection mechanism 110 may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout this document, the term "user" may be interchangeably referred to as "viewer", "observer", "speaker", "person", "individual", "end-user", "developer", "programmer", "administrators", and/or the like. For example, in some cases, a user may refer to an end-user, such as a consumer accessing a client computing device, while, in some other cases, a user may include a developer, a programmer, a system administrator, etc., accessing a workstation serving as a client computing device. It is to be noted that throughout this document, terms like "graphics domain" may be referenced interchangeably with "graphics processing unit", "graphics processor", or simply "GPU"; similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document.

Further, throughout this document, terms like "request", "query", "job", "work", "work item", and "workload" are referenced interchangeably. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referenced as "work unit" or "draw", while "application" may be interchangeably referred to as "workflow" or simply "agent".

For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

Figure 2:
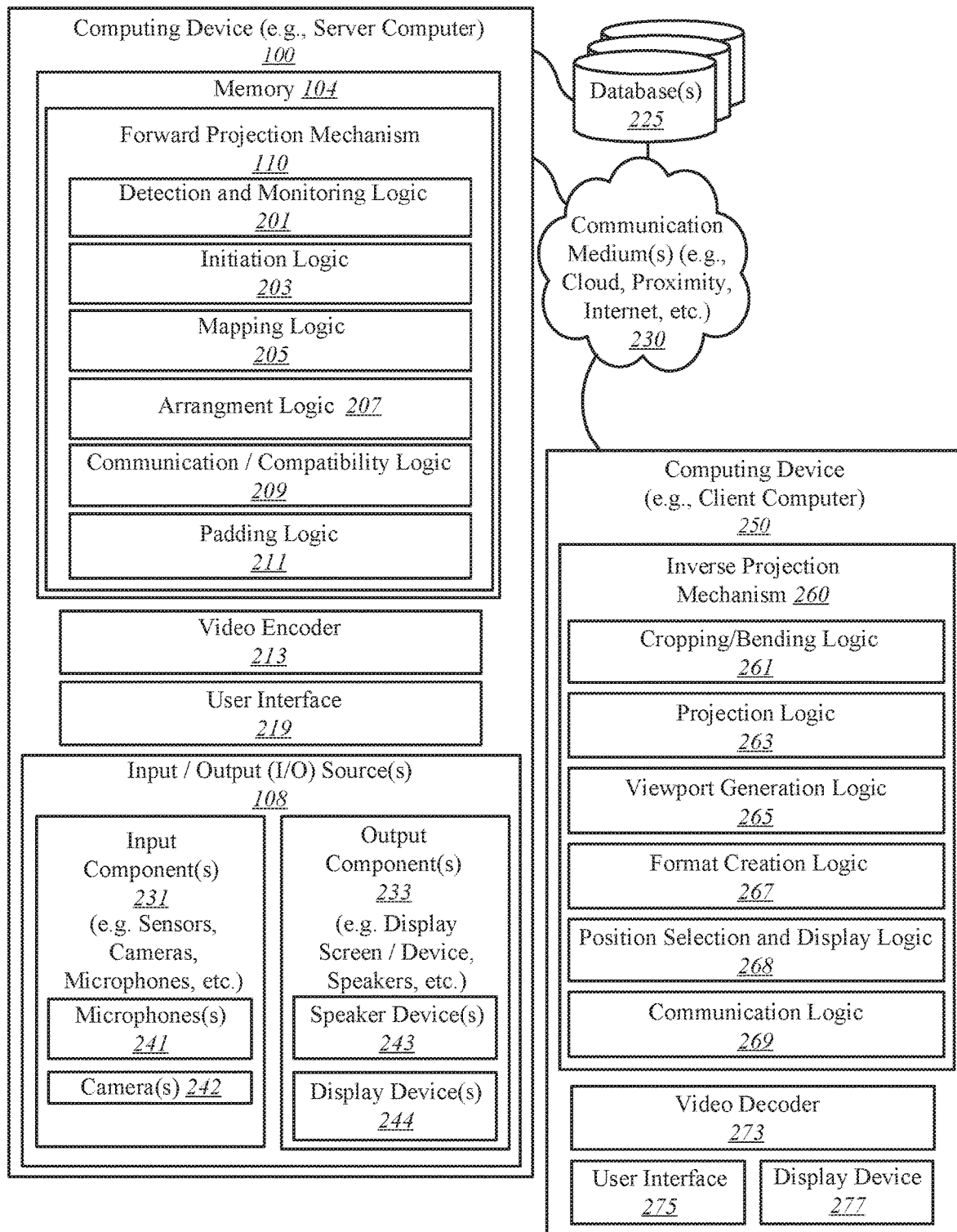
FIG. 2 illustrates the forward projection mechanism of FIG. 1 and an inverse projection mechanism according to one embodiment.

FIG. 2 illustrates forward projection mechanism 110 of FIG. 1 and inverse projection mechanism 260 according to one embodiment. For brevity, many of the details already discussed with reference to FIG. 1 are not repeated or discussed hereafter. In one embodiment, forward projection mechanism 110 may include any number and type of elements or components, such as (but not limited to): detection and monitoring logic 201; initiation logic 203; mapping logic 205; arrangement logic 207; communication/compatibility logic 209; padding logic 211. Computing device 100 further hosts video encoder 213 and user interface 219.

In the illustrated embodiment, computing device 100 represents a server computing device (also referred to as "server device" or simply "server") that is coupled to or in communication with one or more client computing devices, such as client computing device (also referred to as "client device" or simply "client") 250 hosting inverse projection mechanism 260. In one embodiment, inverse projection mechanism 260 may include one or more elements or components, such as (but not limited to): cropping/bending logic 261; projection logic 263; viewport generation logic 265; format creation logic 267; position selection and display logic 268; and communication logic 269. Computing device 250 further hosts video decoder 273, user interface 275; and display device 277.

As with forward projection mechanism 110 at computing device 100, inverse projection mechanism 260 at computing device 250 may be hosted as software, hardware, firmware, or any combination thereof. For example, inverse projection mechanism 260 may be hosted as instructions by memory at computing device 250 and/or as one or more hardware components hosted by or embedded in one or more processors at computing device 250. It is contemplated and to be noted that embodiments are not limited to any implementation.

Computing device 100 further includes user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), microphone(s) 241, sensors, detectors, keyboards, mice, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, an intranet, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O source(s) 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software, hardware, firmware, and/or any combination thereof. For example, logic may itself be or include or be associated with circuitry at one or more devices, such as forward projection component 130 and/or forward projection component 120 hosted by application processor 112 and/or graphics processor 114, respectively, of FIG. 1 having to facilitate or execute the corresponding logic to perform certain tasks. Similarly, inverse projection mechanism 260 may be hosted as one or more inverse projection components by one or more application and/or graphics processors at computing device 250.

Embodiments provide for a novel technique, as facilitated by forward projection mechanism 110 and/or inverse projection mechanism 260, for projecting a hemisphere cube map projection format to represent hemisphere 180°×180° omnidirectional images or videos, such as those captured by a single fisheye lens. For example, as illustrated with reference to FIG. 4A, this novel hemisphere cube map format (HCMP) 400 contains one full cube face 401 and four half cube faces 403A 403B, 405A, 405B, representing the hemisphere, where this full face 401 and half faces 403A 403B, 405A, 405B are arranged in a different and compact layout, such as when compared to the existing CMP format, in order to reduce the picture size, by eliminating inactive regions. In other words, this novel technique provides for a better and more efficient matter of offering the results. Further, this proposed novel HCMP layout may be used with any cube-based projection format as well as for a hemispherical version of the Equi-Angular Cube map (EAC) format, where this novel format is referred to as a hemispheric EAC (HEAC) format. In one embodiment, these novel HCMP and HEAC formats may be added to software, such as 360Lib software.

For example, 360°×180° omnidirectional content can be captured using two back-to-back fisheye camera lenses and then stitching together the content. A single fisheye camera lens can capture 180°×180° content, representing a single hemisphere, instead of the full sphere. It is contemplated that a fisheye camera is used as an example and that embodiments are not necessarily limited as such. Further, for example, one or more cameras referred to throughout this document may be included in camera(s) 242, where camera(s) 242 can be part of embedded in computing device 100 or independently placed, such as at a street corner or in a room, that is communicatively coupled to computing device 100 over one or more communication medium(s) 230.

Some of content being used in MPEG's 3DoF+ project in MPEG-I Visual is 180°×180° content in an ERP format, such as the TechnicolorHijack sequence, where Omnidirectional Media Format (OMAF) defines a fisheye format, while Joint Collaborative Team on Video Coding (JCT-VC) develops a fisheye projection format supplemental enhancement information (SEI) message, which enables coding of fisheye content in its native captured format. See Joint Video Experts Team (JVET) of ITU-T SG 16 WP 3 and ISO/IEC JTC 1/SC 29/WG 11, 13th Meeting, Marrakech, Mass., Jan. 9-18, 2019. However, it is expected that fisheye format is not a bitrate efficient format for video encoding, because of image warping. Currently, there are no techniques (such as algorithms) available for the fisheye format under consideration by JCT-VC that implements the fisheye projection equations.

Figure 3A:
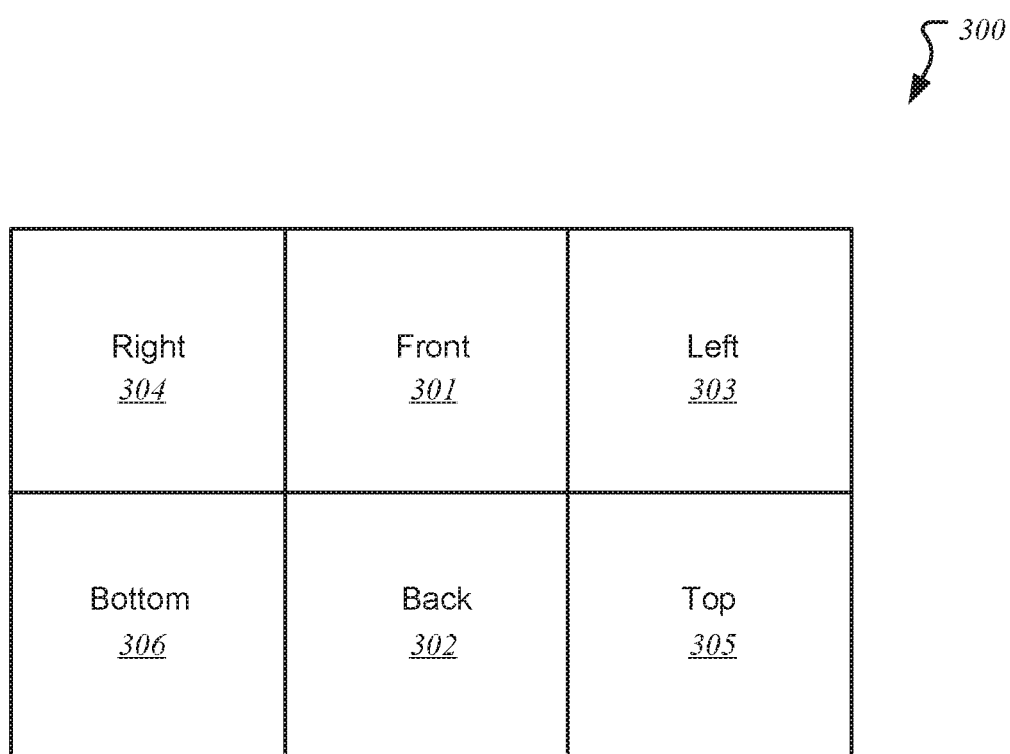
FIG. 3A illustrates a conventional cube map layout.
Figure 3B:
FIG. 3B illustrates a conventional CMP-based image.
Figure 3C:
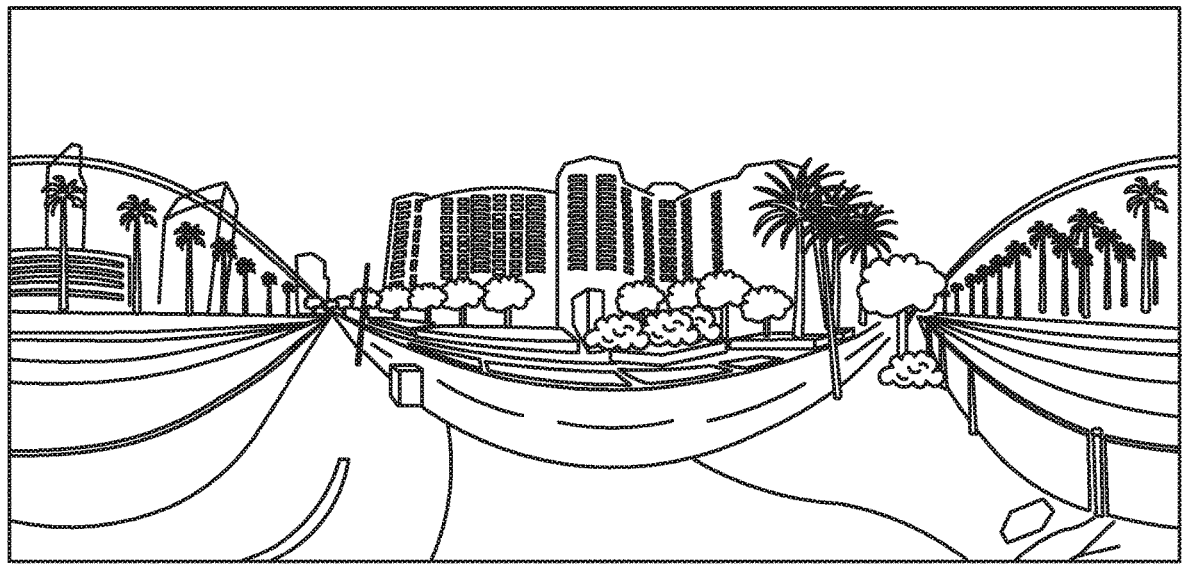
FIG. 3C illustrates a conventional equirectangular projection (ERP) format-based image.
Figure 3D:
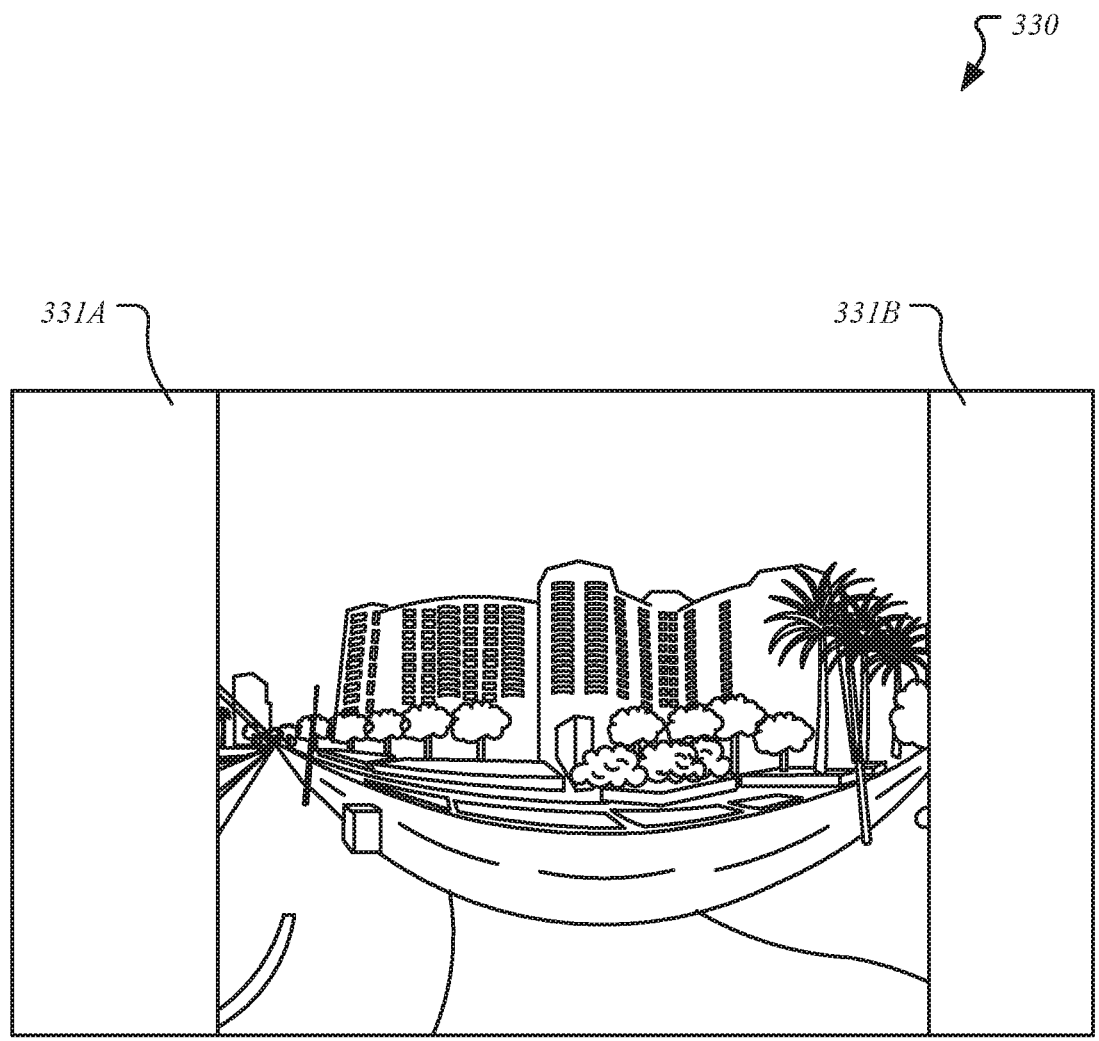
FIG. 3D illustrates a conventional cropped ERP format-based image.
Figure 3E:
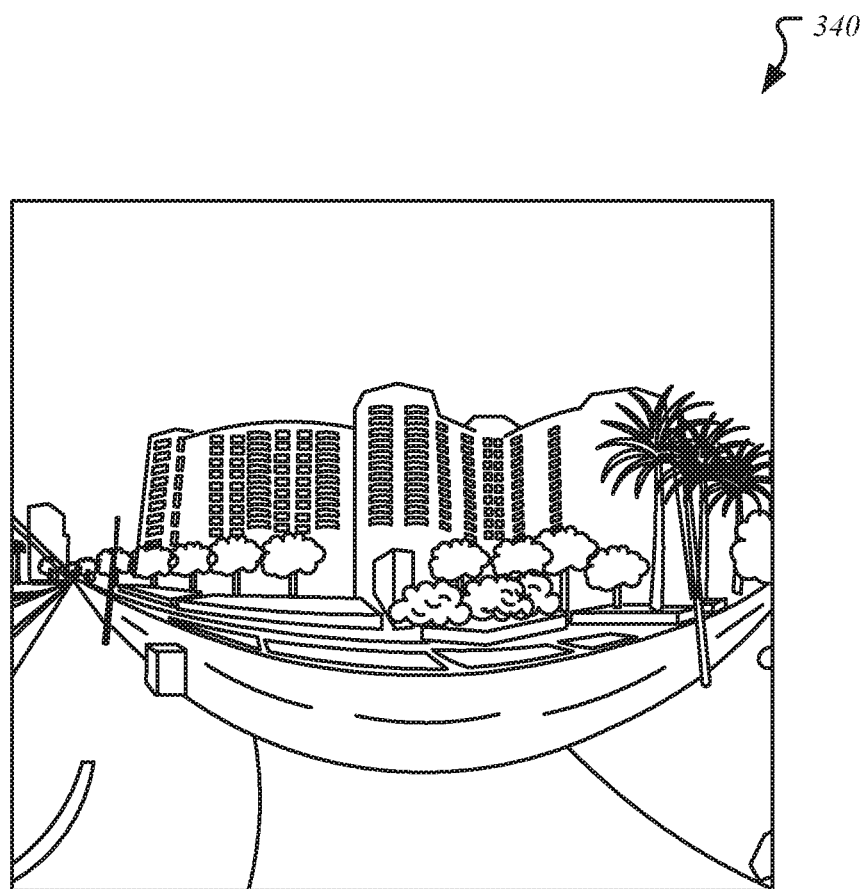
FIG. 3E illustrates a conventional semi-ERP format-based image.
Figure 3F:
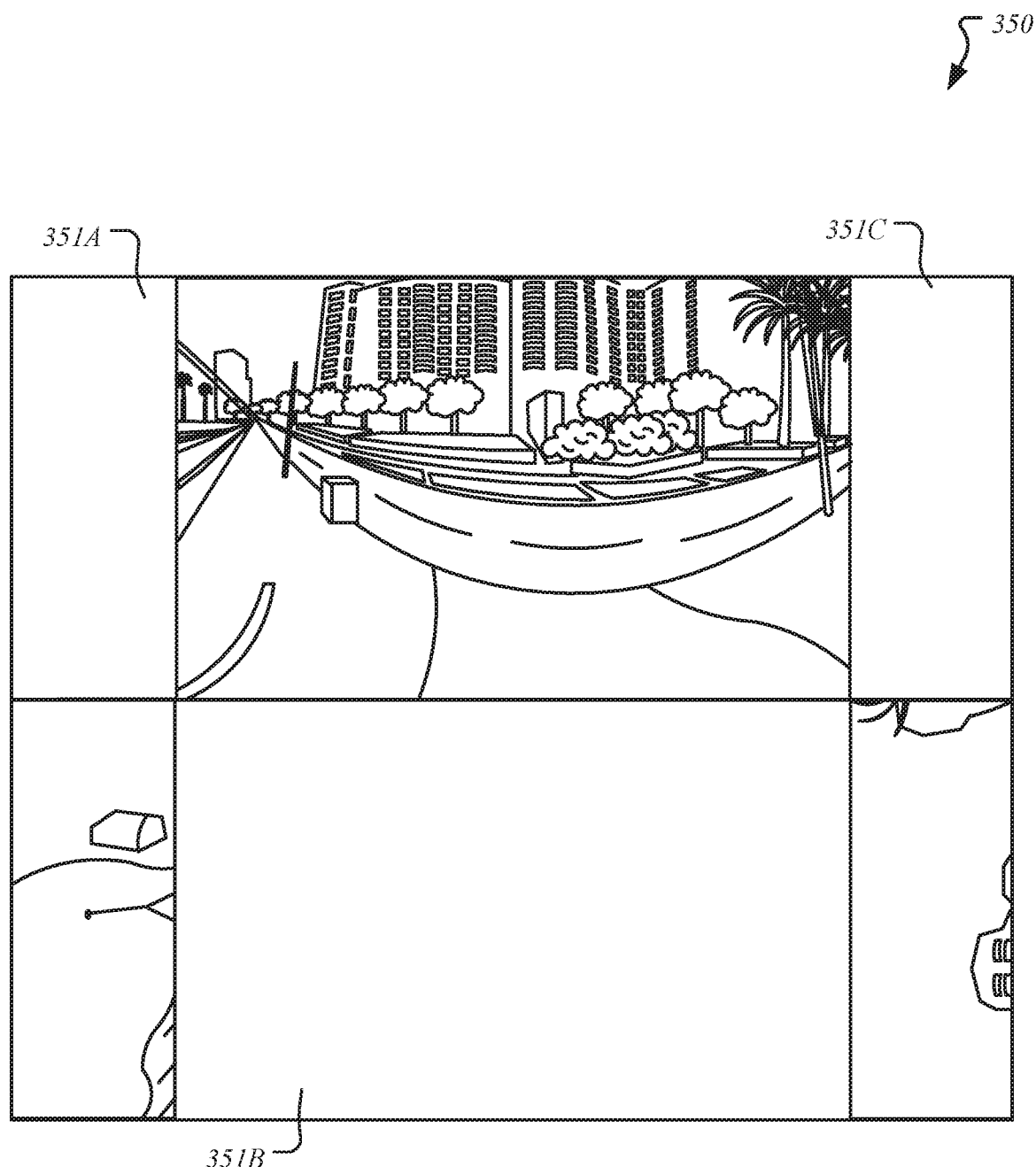
FIG. 3F illustrates a conventional cropped CMP format-based image with inactive regions.

Conventionally speaking, as illustrated with respect to FIG. 3A, it indicates various positions of the different faces of a cube in a CMP format layout 300 in 360Lib based on a cube map format-based image 310 (such as from the Trolley sequence) of FIG. 3B. As illustrated, conventional CMP format layout 30 of FIG. 3A shown six faces, including front 301, back 302, left 303, right 304, top 305, and bottom 306. FIG. 3C illustrates another conventional ERP version-based image 320 of the Trolley sequence. FIG. 3D illustrates cropping of the 180°×180° content in the center of a conventional ERP format-based image 330, showing black background 331A, 331B on either side. FIG. 3E shows a conventional semi-ERP format-based image 340, where only the active region is retained, as is used in the 3DoF+TechnicolorHijack sequence. FIG. 3F illustrates a conventional CMP-format 180°×180° cropped trolley image 350 indicating inactive or unused regions 351A, 351B, 351C that cannot be directly cropped to reduce higher frame size, pixel rate, level, etc.

Figure 4A:
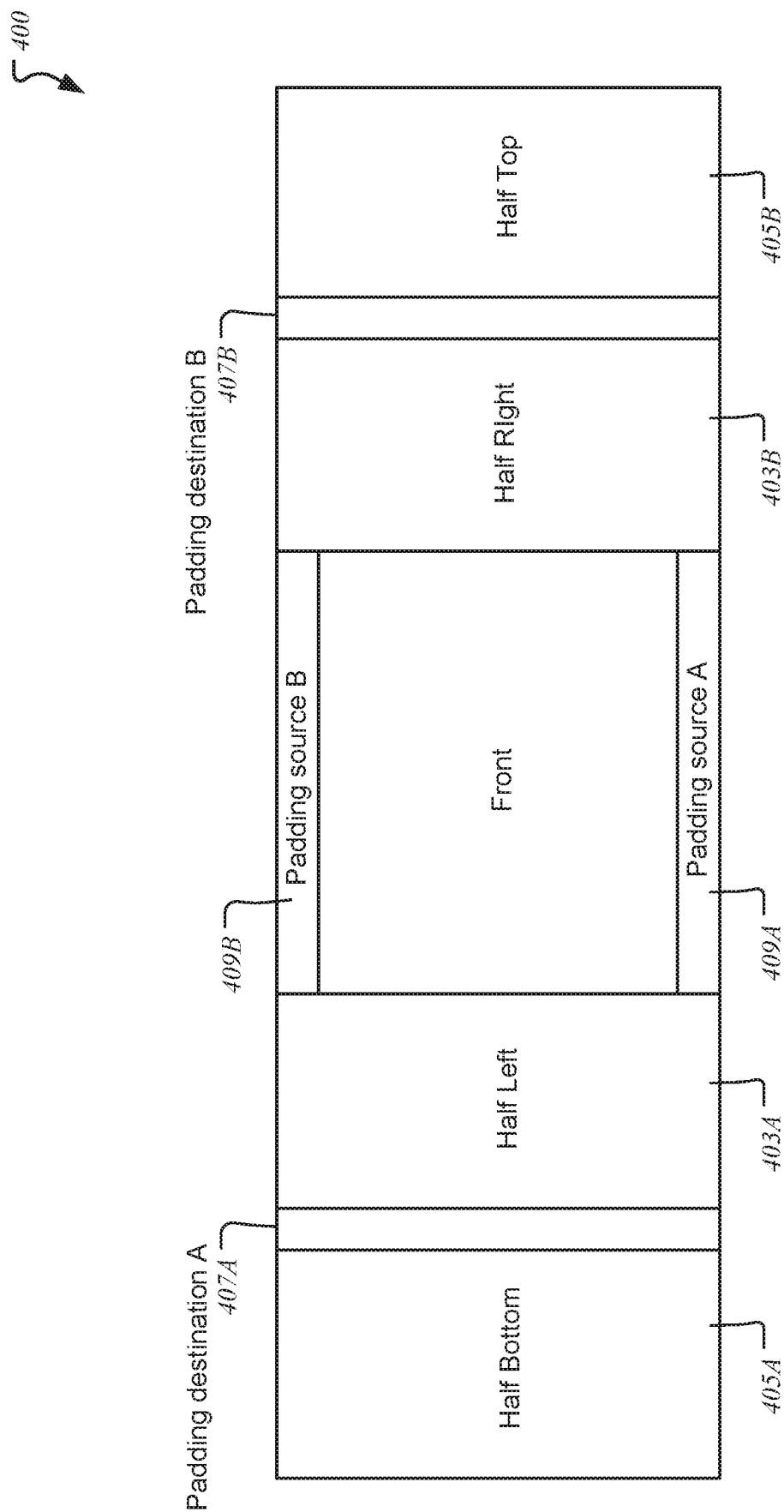
FIG. 4A illustrates a hemisphere CMP layout according to one embodiment.

Embodiments provide for a novel technique where a 180°×180° hemisphere can be projection mapped to half of a cube, with active content in one full face, such as front 401, and four half faces, such as half left 403A, half right 405A, half bottom 405A, and half top 405B, as illustrated with respect to FIG. 4A.

In one embodiment, at computing device 100, images and/or videos (having sequences of images) are captured by one or more camera(s) 242, while detection and monitoring logic 201 continuously detects and monitors each image and its active and inactive regions. Upon detection of sections or areas of an image that are active and inactive, initiation logic 203 is triggered to initiate with a format using any 180°×180° of the image, where this initial format may include a fisheye format, an ERP format, etc. With this initiation, mapping logic 205 is then triggered to map the various parts of the image to form a single full face, such as full face 401 of FIG. 4A, and multiple half faces, such as four half faces 403A, 403B, 405A, 405B of FIG. 4A.

In this proposed novel HCMP format, such as HCMP format 400 of FIG. 4A, arrangement logic 207 is then used to arrange this full face 401 and half faces 403A-405B into a compact area, avoiding any inactive regions, such as when using the CMP format. Further, in one embodiment, neighbor continuity in the hemisphere is maintained in the entire layout, with a single continuous region across half left face 403A, front face 401, and half right face 403B as facilitated by arrangement logic 207 and illustrated with respect to FIG. 4A. Similarly, half top face 405B and half bottom face 405A are rotated and arranged on either side of the single continuous region as facilitated by arrangement logic 207 and illustrated by FIG. 4A.

Further, in one embodiment, padding logic 211 is triggered to add active padding to the format, such as HCMP format 400 of FIG. 4A, by copying samples from spherical neighbors, such as padding sources A 409A, B 409B shown horizontally above and below, respectively, of front face 401, and padding destination A 407A, B 407B shown vertically on the left of half left face 403A and right of half right face 403B, respectively, in FIG. 4A. Further, as facilitated by padding logic 211, active padding may be added at any discontinuous boundaries that are copied (and rotated) from any corresponding neighboring locations in the image.

Figure 4B:
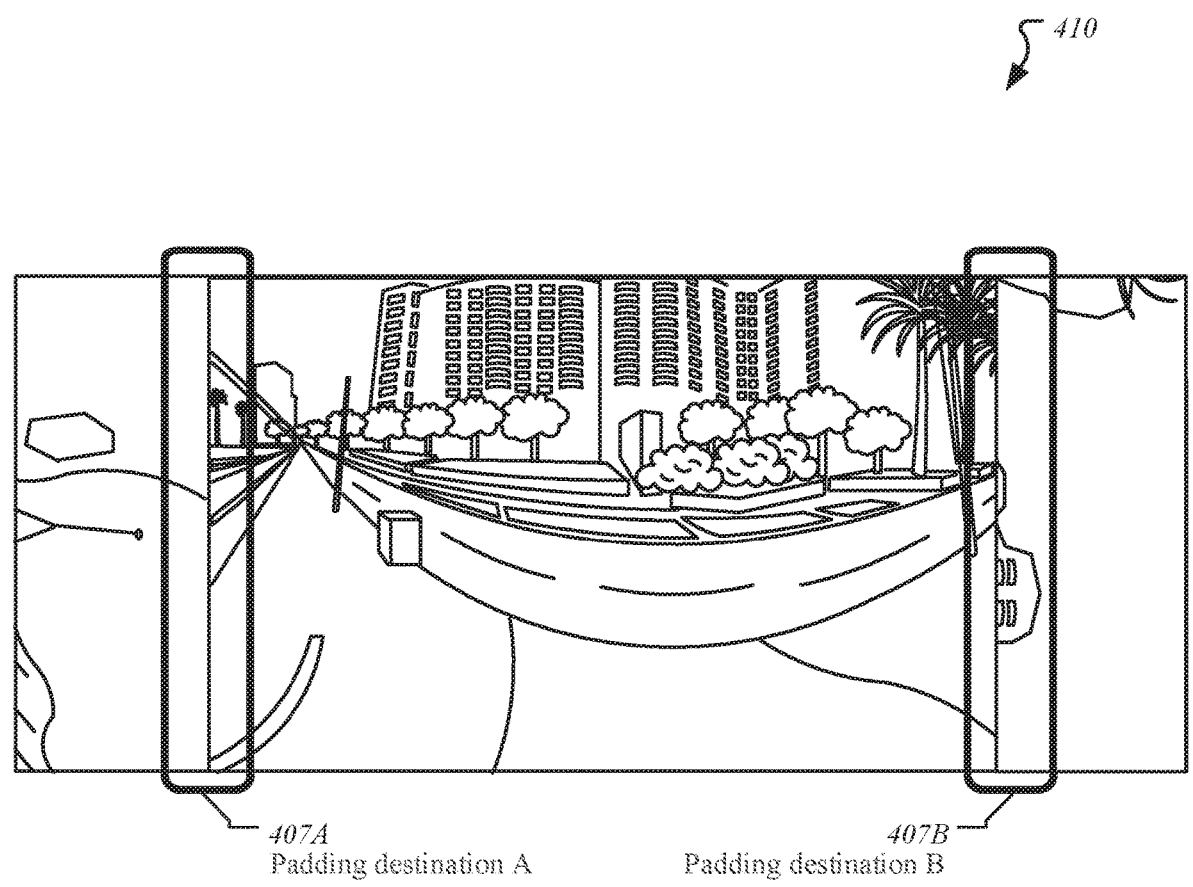
FIG. 4B illustrates a two-dimensional hemisphere CMP projection with padding according to one embodiment.
Figure 4C:
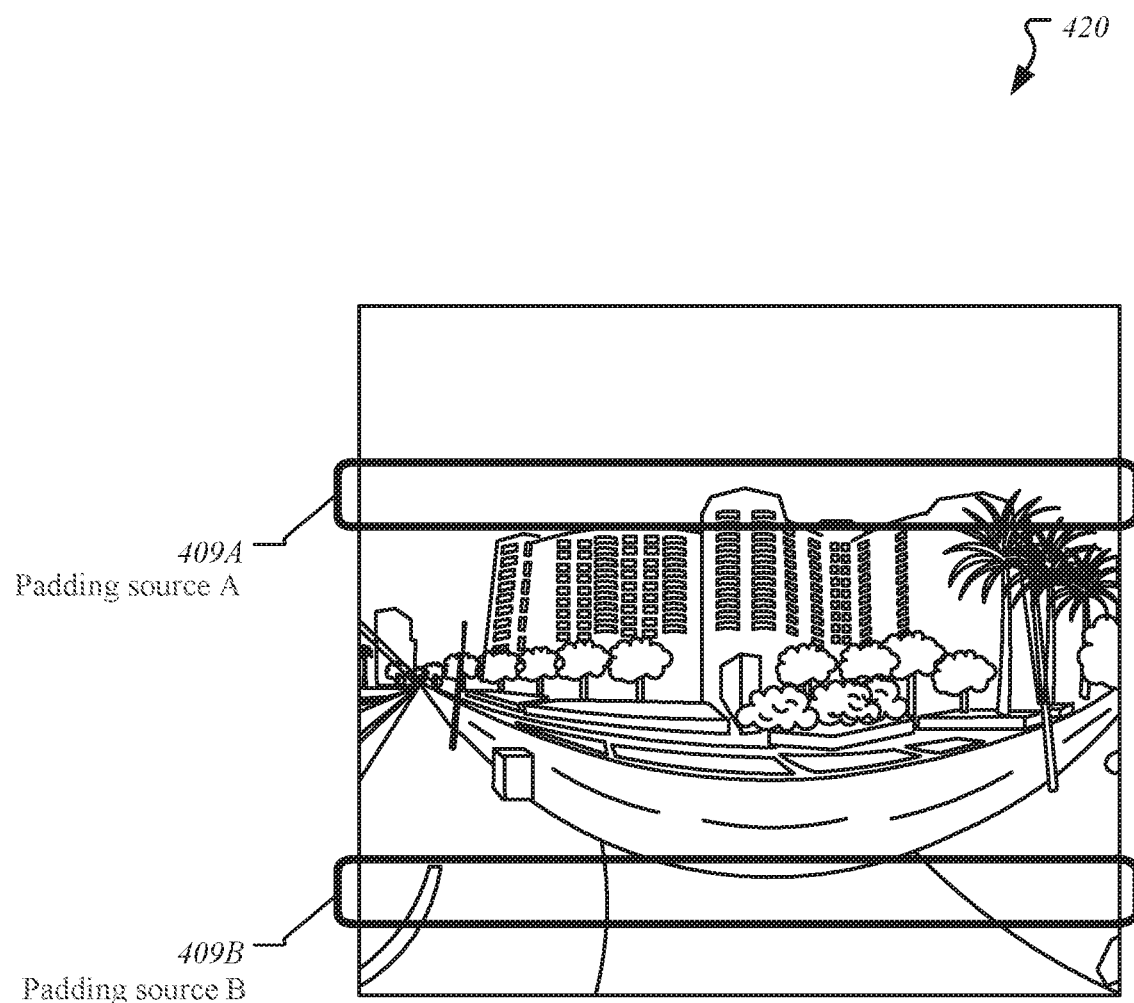
FIG. 4C illustrates a two-dimensional semi-ERP projection with padding according to one embodiment.
Figure 4D:
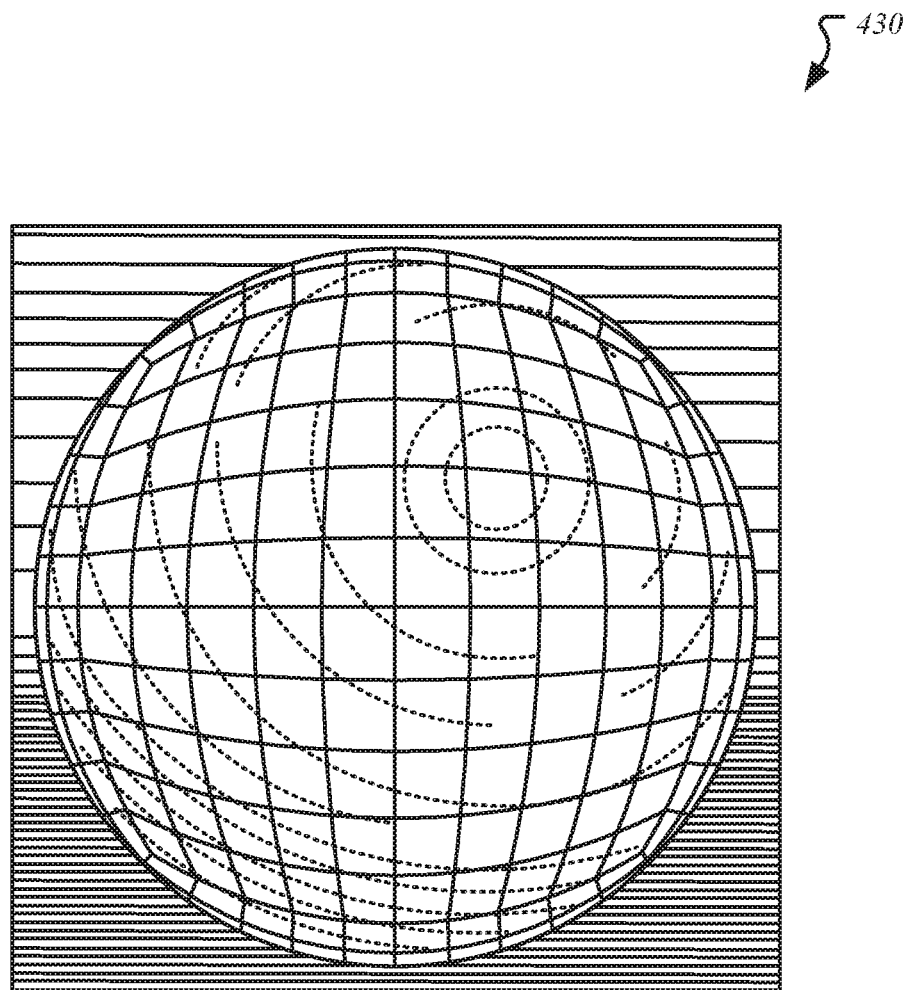
FIG. 4D illustrates a three-dimensional spherical view according to one embodiment.

As further illustrated with reference to images 410 and 420 of FIGS. 4B and 4C, respectively, padding destinations A 407A and B 407B and padding sources A 409A and B 409B of FIG. 4A are shown as corresponding to padding destinations A 407A and B 407B of image 410 (e.g., two-dimensional (2D) HCMP projection image) of FIG. 4B and padding sources A 409A and B 409B of image 420 (e.g., 2D semi-ERP or HERP projection image) of FIG. 4C, respectively. FIG. 4D illustrates an image represented by sphere 430 as further projected in HCMP format 400 of FIG. 4A. In one embodiment, the proposed novel layout is also applicable with other cube-based formats, such as EAC, HEC, etc.

Continuing with forward projection mechanism 110, this novel format arrangement is then received at video encoder 213, where video encoder 213 encodes the pertinent data and communicates, as facilitated by communication/compatibility logic 209 and/or communication logic 269, the encoded data over to video decoder 273 at computing device 250 over one or more communication medium(s) 230, such as a proximity network, a cloud network, the Internet, etc.

In one embodiment, video decoder 273 decodes the encoded data and provides it to inverse projection mechanism 260 for performing inverse projection and other relevant processes. For example, upon receiving the decoded data at inverse projection mechanism 260, cropping/bending logic 261 is triggered to crop or blend the padded regions of the novel format layout. In one embodiment, projection logic 263 is then triggered to project mapping of the novel format layout to the hemisphere, such as projecting the full front face along with the four half faces to the hemisphere.

Once the projection is completed, in one embodiment, viewport generation logic 265 may be used to generate a viewport for viewing of the image by a user using display 277, where the viewing may be less than the full 180°×180° hemisphere. Similarly, in another embodiment, format creation logic 267 is used to create a 180°×180° hemisphere format in content in fisheye or ERP format. As described earlier, such an image is then displayed to the user using display device 277 and as facilitated by user interface 275.

Referring back to input component(s) 231, they may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

The JVET 360 CTC sequences are cropped in the center to create 180°×180° sequences, as illustrated with respect to FIG. 3D, and treated as the original sequences. For example, sequences with 8192×4096 resolution are cropped to 4096× 4096 resolution, where all other stages in the JVET 360 CTC were followed, except for halving the horizontal resolution, and HM 16.15/360Lib-3.0 and VTM 3.0 were used. Further, the conditions of JVET-K1012-v1 are adapted for a hemisphere format, such as for ERP a face size of 2216×2216 is used, and for HCMP/HEAC face sizes are 1280×1280. In addition, HCMP uses 8 pixels width of padding for each one and thus the total width is as calculated as follows: 3*1280 (faces)+2*8 (padding)=3856 pixels.

Figure 4E:
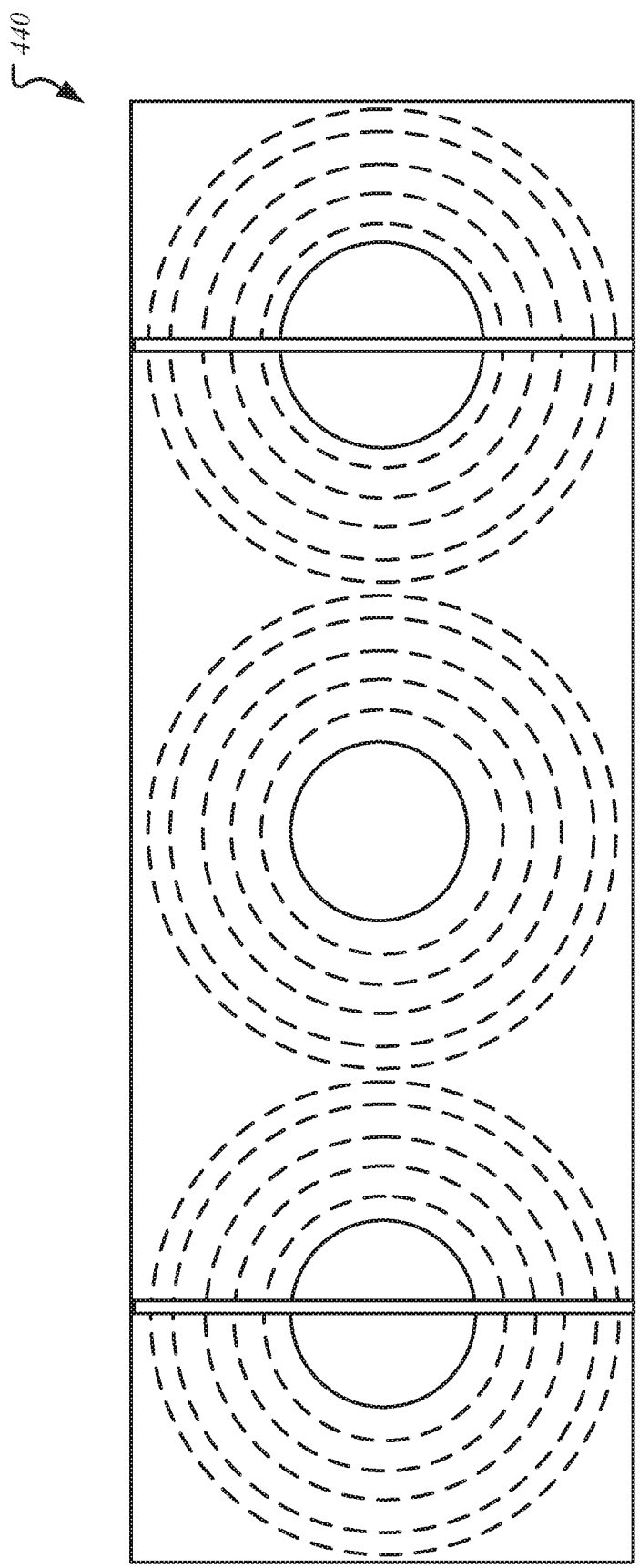
FIG. 4E illustrates a hemisphere CMP format with weighted spherical-peak signal-to-noise ratio weights according to one embodiment.

Moreover, the 360Lib software is modified to support 180°×180° content, where that support was added for the proposed HCMP and HEAC formats. For example, the novel projection format is based on or provides for conversion to and/or from 360° normalized sphere, with 2D YUV read and/or write, 360Lib's config file support extended to support half faces, source field-plate (FP) structure parameters, coding FP structure parameters, and padding control defined per codingPCMP, input PCMP, etc. Further, regarding weighted spherical (WS)-peak signal-to-noise ration (PSNR), FIG. 4E illustrates WS-PSNR weights for HDMP format 440.

Fisheye Comparison

In comparing this novel HEAC format with natively coding a fisheye format, for four of the sequences, while cropped ERP sequences are converted to the fisheye format, such as using the Hugin open source project, with an intermediate conversion to red green blue (RGB), and a resolution of 2048×2048. Conventional techniques do not offer support for fisheye format in the 360Lib software.

Table 5 illustrates that the HEAC format saves between 68.6% and 81.1% bitrate versus a conventional fisheye format and this is because of the multiple intermediate conversion steps that introduce some coding loss.

TABLE 5

| HEAC versus Fisheye | |
|---|---|
| | WS-PSNR (End to End) HEAC vs. Fisheye |
| Trolley | −81.1% |
| GasLamp | −70.7% |
| KiteFlite | −68.6% |
| Harbor | −78.6% |

Embodiments provide for addition of HCMP and HEAC to 360Lib, and using cube map-based formats, such as EAC, as shown above, to provide significant bitrate reduction versus ERP formats for 360°×180° spherical contents. This novel technique provides similar benefits for 180°×180° spherical contents, such as when images and/or videos are captured using a single fisheye lens camera, such as camera(s) 242. Further, this proposed novel layout requires smaller pictures sizes as opposed to when using existing CMP or EAC format, which enables using a lower level to a code hemispherical video sequence.

Referring back to I/O source(s) 108, it is contemplated that embodiments are not limited to any number or type of microphone(s) 241, camera(s) 242, speaker(s) 243, display(s) 244, etc., for capture or presentation of data. For example, as facilitated by detection and monitoring logic 201, one or more of microphone(s) 241 may be used to detect speech or sound simultaneously from users, such as speakers. Similarly, as facilitated by detection and monitoring logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or video streams.

Similarly, as illustrated, output component(s) 233 may include any number and type of speaker(s) or speaker device(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

Further, input component(s) 231 may include any number or type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitation): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, database(s) 225, and/or communication medium(s) 230, etc., and any number and type of other computing devices 250A, 250B, 250C, 260A, 260B, 260N (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, firmware, and/or any combination thereof. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "hemisphere", "cube map projection", "hemisphere cube map projection format", "HCMP", "equirectangular projection", "HERP", "front face", "half face", "padding", "projection mapping", "forward projection", "inverse projection", "viewport generation", "inverse projection", "format creation", "video encoding", "video decoding", "fisheye camera", "fisheye format", "mapping", "arranging", "padding", "cropping", "blending", "projecting", "creating", "generating", "depth", "pixel depth", "creating", "training", "inferencing", "classifying", "estimating", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from forward projection mechanism 110 and/or one or more of forward projection components 120, 130 of FIG. 1 and/or inverse projection mechanism 260 (and/or one or more inverse projection components) of FIG. 2 to facilitate various embodiments including adding, removing, and/or enhancing certain features. For brevity, clarity, and ease of understanding of forward projection mechanism 110 and/or one or more of forward projection components 120, 130 of FIG. 1 and/or inverse projection mechanism 260 (and/or one or more inverse projection components) of FIG. 2, many of the standard and/or known components, such as those of a computing device are not shown or discussed here. It is contemplated that embodiments, as described herein, are not limited to any technology, topology, system, architecture, and/or standard and are dynamic enough to adopt and adapt to any future changes.

Figure 5:
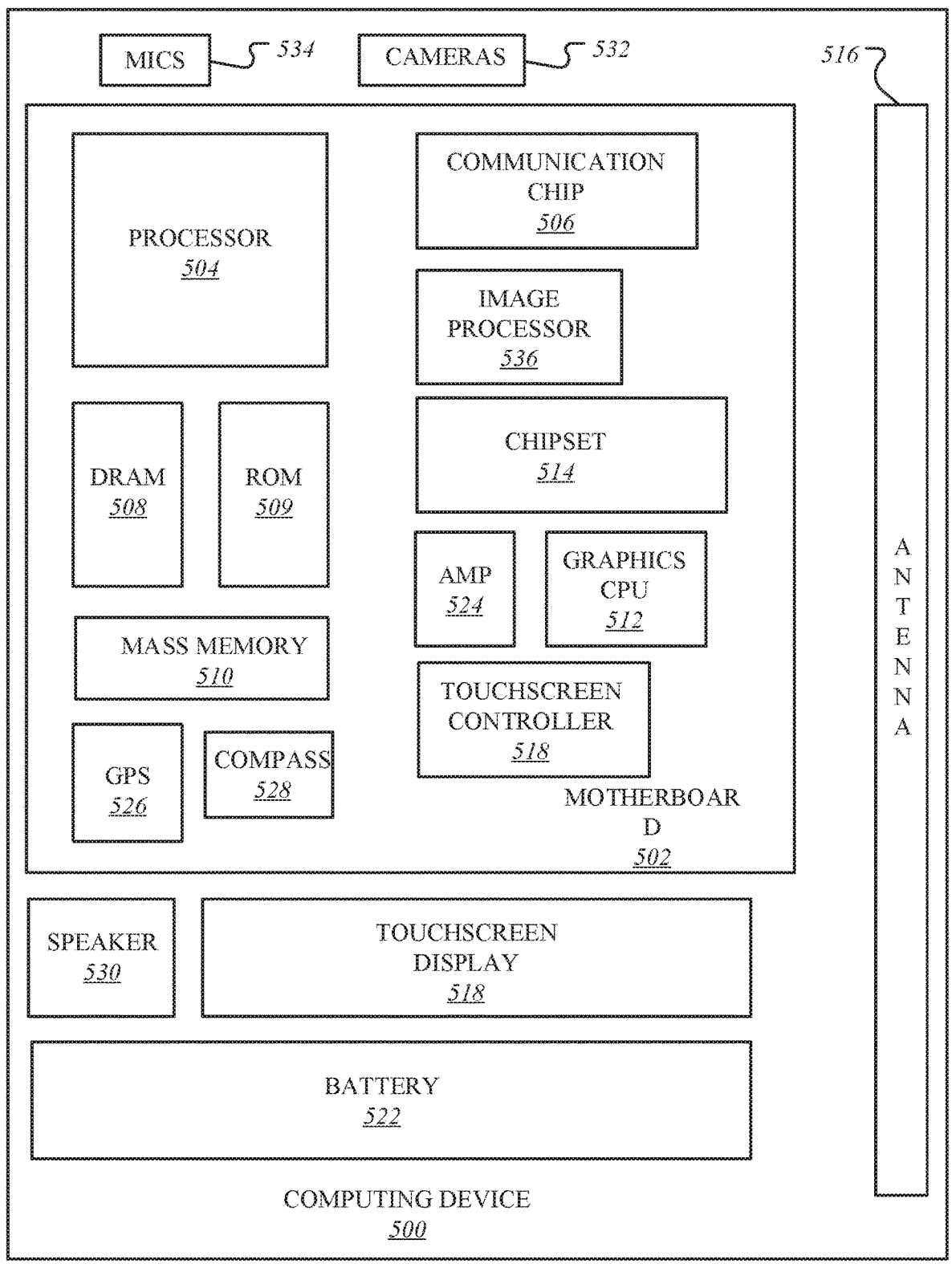
FIG. 5 illustrates a computing device capable of supporting and implementing one or more embodiments.

FIG. 5 illustrates a computing device 500 capable of supporting and implementing one or more embodiments. The illustrated computing device 500 may be same as or similar to computing devices 100, 250 of FIG. 2. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments.

Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6A:
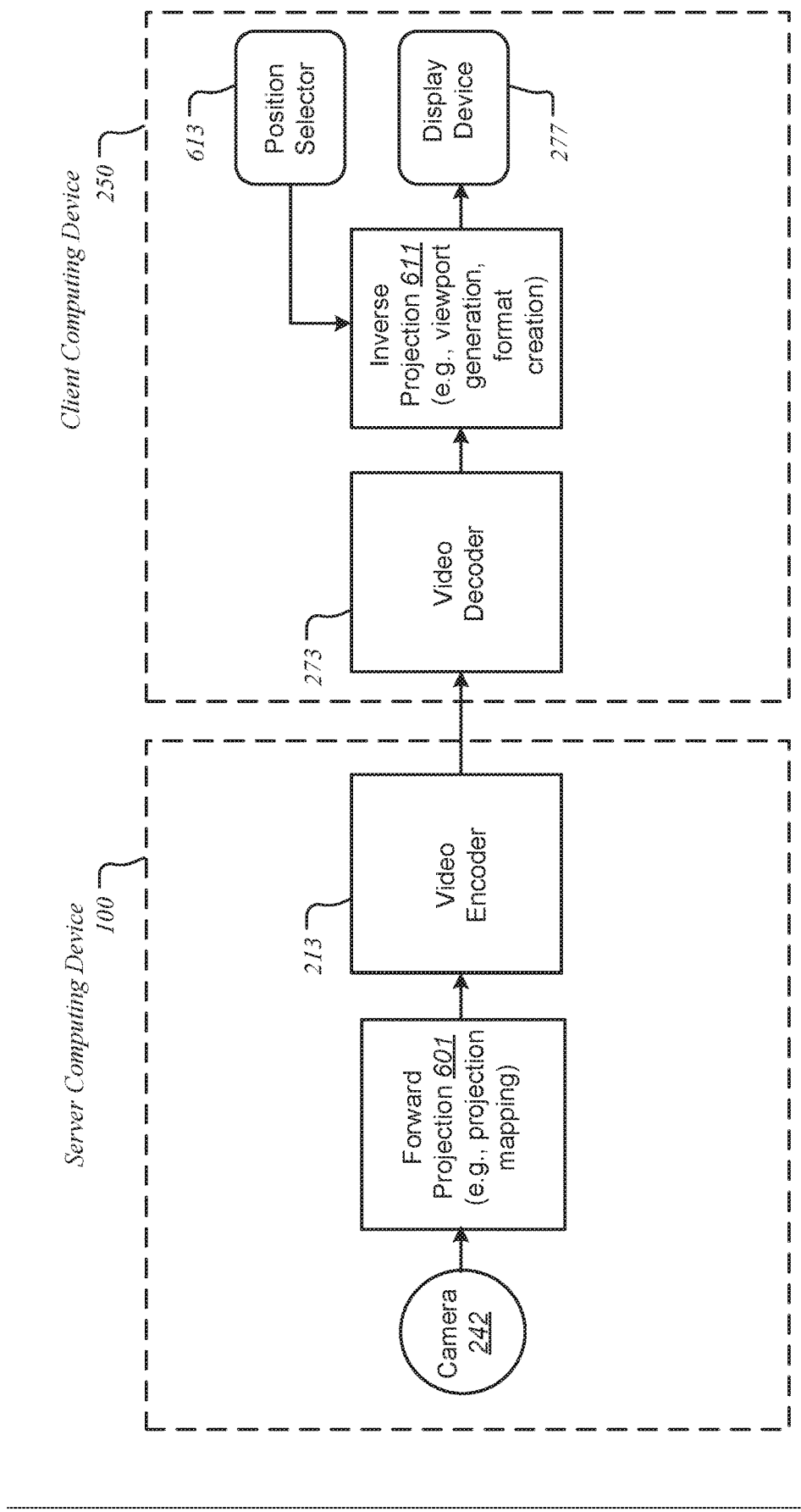
FIG. 6A illustrates a transaction sequence over a panoramic video system with a hemisphere cube map according to one embodiment.

FIG. 6A illustrates a transaction sequence 600 over a panoramic video system with a hemisphere cube map according to one embodiment. For the sake of brevity, many of the details previously mentioned or discussed with reference to FIGS. 1-5 may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by forward projection mechanism 110 and/or one or more of forward projection components 120, 130 of FIG. 1 and/or inverse projection mechanism 260 and/or one or more of inverse projection components (not shown) of FIG. 2. Any processes or transactions associated with this and other illustrations may be illustrated or recited in linear sequences for brevity and clarity in presentation; however, it is contemplated that any number of them can be performed in parallel, asynchronously, or in different orders.

As illustrated in FIG. 6A, at server computing device 100, images and/or videos are captured using camera 242, where, as previously described with reference to FIG. 2, this captured information is then offered for forward projection (projection mapping, etc.) 601 as facilitated by forward projection mechanism 110 of FIG. 1. Once this forward projection mapping is performed, the resulting data is then encoded using video encoder 213 and communicated over to video decoder 273 at client computing device 250. The encoded data is then decoded using video decoder 273 and forwarded on for inverse projection (viewport generation, format creation, etc.) 611 as facilitated by inverse projection mechanism 260 and further described with reference to FIG. 2.

For example, as determined and selected by position selector 613 and as facilitated by position selection and display logic 268 of FIG. 2, in one embodiment, a hemisphere content format (e.g., 180°×180° degrees hemisphere format in content in fisheye or ERP format) may be created or, in another embodiment, a viewport (of less than 180°× 180° degrees) may be generated for viewing by a user through display device 277.

Figure 6B:
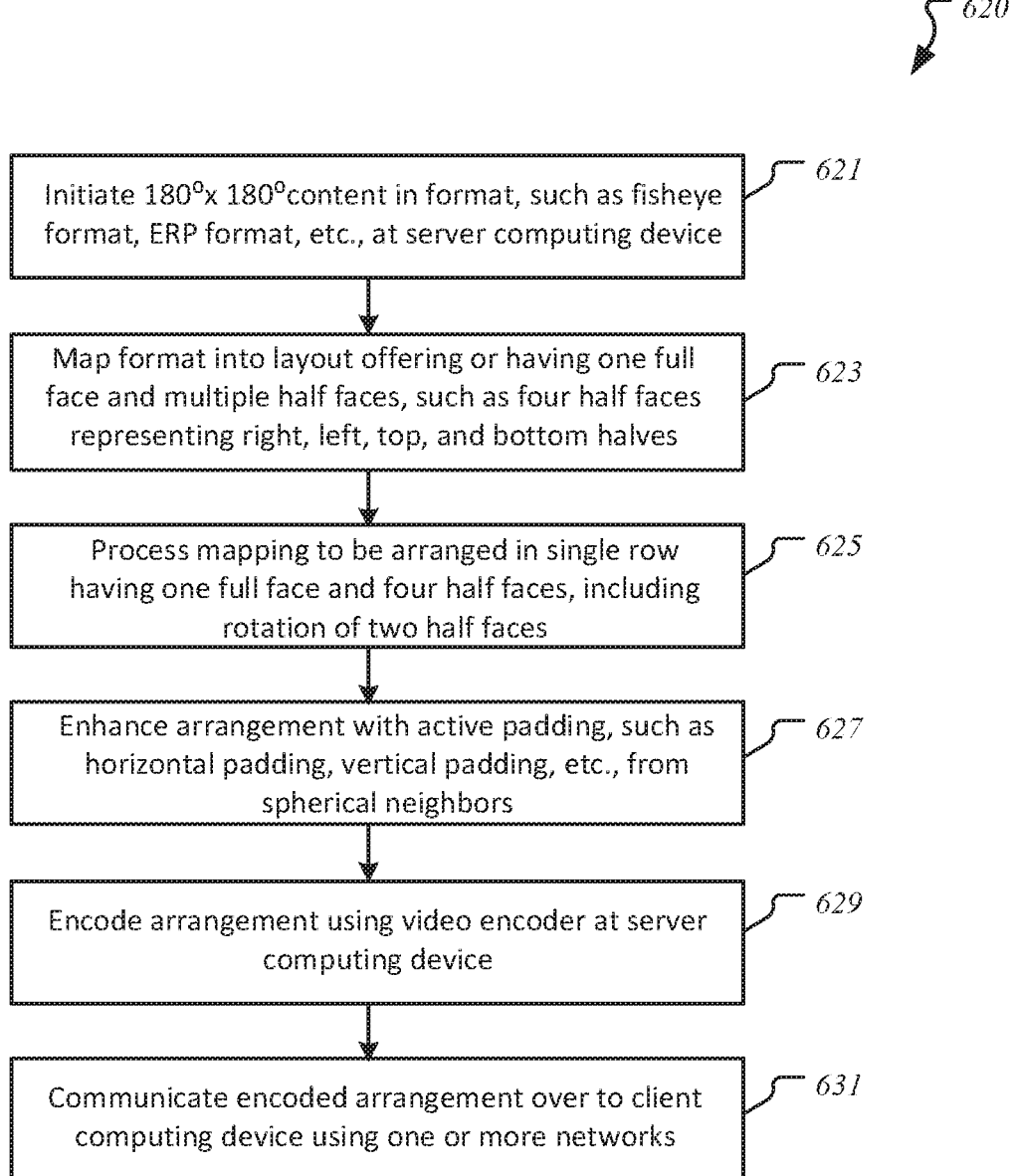
FIG. 6B illustrates a method for forward projection according to one embodiment.

FIG. 6B illustrates a method 620 for forward projection according to one embodiment. For the sake of brevity, many of the details previously mentioned or discussed with reference to FIGS. 1-6A may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by forward projection mechanism 110 and/or one or more of forward projection components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

Method 620 begins at block 621 with initiation of 180°× 180° content in a format, such as a fisheye format, ERP format, etc., at a server computing device. At block 623, the format is then mapped into a layout offering or having a full face and multiple half faces, such as four half faces representing right, left, top, and bottom halves. In one embodiment, at block 625, this mapping is then processed to be arranged in having the full face and the four half faces in a single row, including rotation of two half faces. At block 627, the arrangement is enhanced with active padding, such as horizontal padding, vertical padding, etc., from spherical neighbors. At block 629, this arrangement is then encoded using a video encoder at the server computing device and then, at block 631, the encoded arrangement is communicated over to a client computing device using one or more networks, such as a proximity network, a cloud network, the Internet, etc.

Figure 6C:
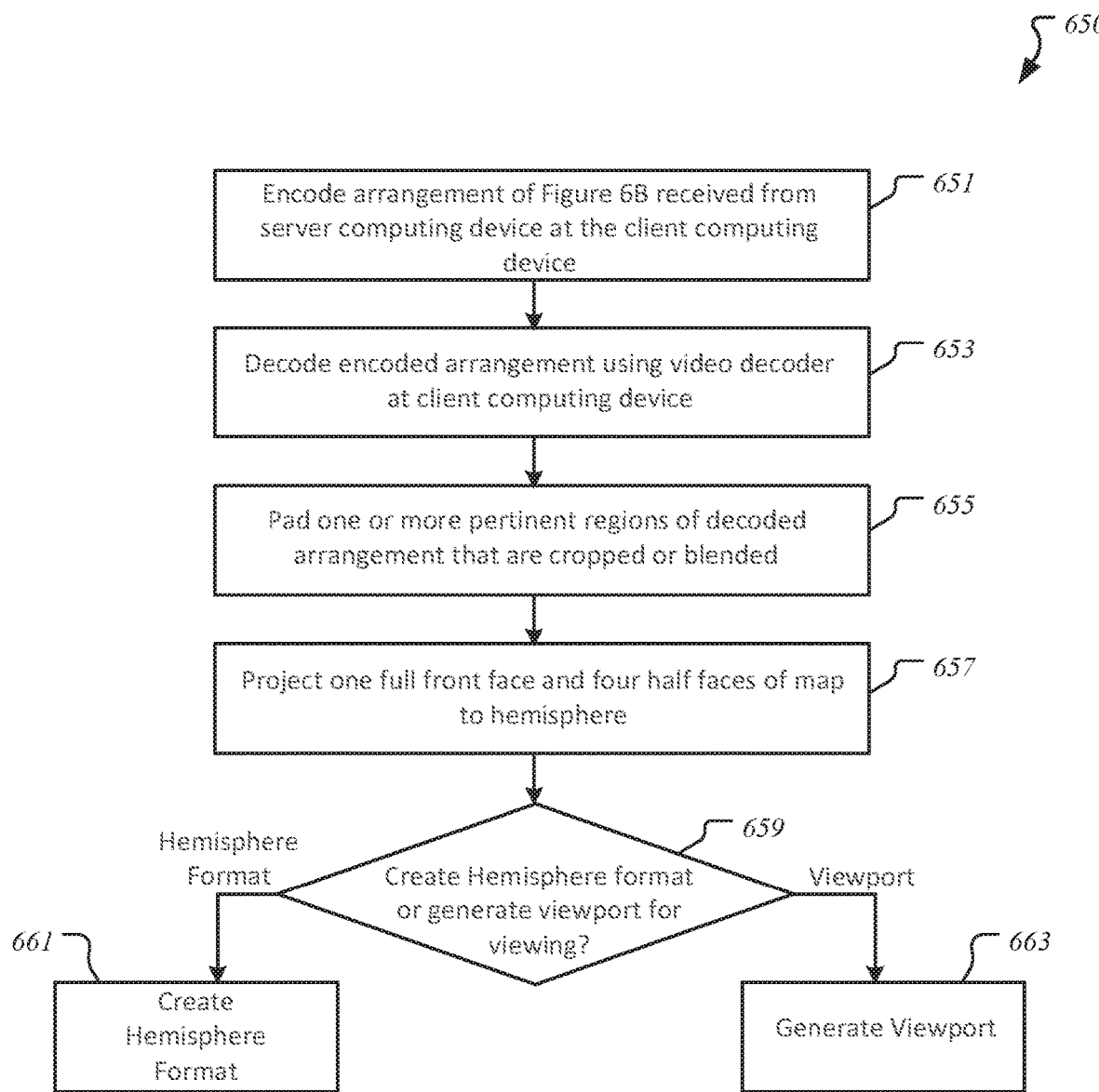
FIG. 6C illustrates a method for inverse projection according to one embodiment.

FIG. 6C illustrates a method 650 for inverse projection according to one embodiment. For the sake of brevity, many of the details previously mentioned or discussed with reference to FIGS. 1-6B may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by inverse projection mechanism 260 and/or one or more of inverse projection components (not shown) of FIG. 2. Any processes or transactions associated with this and other illustrations may be illustrated or recited in linear sequences for brevity and clarity in presentation; however, it is contemplated that any number of them can be performed in parallel, asynchronously, or in different orders. At block Method 650 begins at block 651 with receiving of the encoded arrangement of FIG. 6B from the server computing device at the client computing. At block 653, the encoded arrangement is then decoded by a video decoder and once the arrangement is decoded, then, at block 655, the padded regions of the arrangement are cropped or blended. At block 657, the full front face and the four half faces of the map are projected to the hemisphere. At block 659, a determination is made as to whether a hemisphere format be crated in content in fisheye or ERP format or a viewport be generated for viewing through a display device. If the hemisphere format is selected, then at block 667, the hemisphere format is generated. If the viewport is selected, then at block 669, the viewport is generated.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate hemisphere cube map projection format imaging environments, the apparatus comprising: one or more processors coupled to memory, the one or more processors to: capture, by a camera, an image having image content, wherein the image content being represented by the image is omnidirectional such that the image content is mapped on a sphere while representing less than the sphere; map the image to a cubic representation based on six faces of a cube, wherein one or more of the six faces are classified as inactive regions such that they remain unoccupied or partially occupied; and arrange, based on the cubic representation, the six faces in a compact representation by avoiding inclusion of the inactive regions.

Example 2 includes the subject matter of Example 1, wherein the six faces are arranged in a single row and include one full face and four partial faces.

Example 3 includes the subject matter of Examples 1-2, wherein the one or more processors are further to apply padding to one or more regions having valid neighboring regions represented on the sphere and avoid padding of other regions lacking one or more of the valid neighboring regions and offering partial spherical representation.

Example 4 includes the subject matter of Examples 1-3, wherein the cube representation is based on one or more of a hemisphere cube map format (HCMF) format and a hemisphere equiangular cube map (HEAC) format, wherein a hemisphere is less than the sphere and is represented by one full face and four half faces, wherein the padding is further applied to the hemisphere.

Example 5 includes the subject matter of Examples 1-4, wherein the one or more processors are further to encode the arrangement using a video encoder and communicate the encoded arrangement over to a computing device via one or more networks, wherein the one or more processors co-located on a common semiconductor package include one or more of a central processing unit and a graphics processing unit.

Some embodiments pertain to Example 6 that includes an apparatus to facilitate hemisphere cube map projection format imaging environments, the apparatus comprising: one or more processors coupled to memory, the one or more processors to: receive an encoded arrangement of the six faces of a cube based on a cubic representation of an image having image contents, wherein one or more of the six faces are classified as inactive regions such that they remain unoccupied or partially occupied; and decode, via a video decoder, the encoded arrangement into a decoded arrangement.

Example 7 includes the subject matter of Example 6, wherein an arrangement, when encoded or decoded, offers a compact representation of the cubic representation by avoiding including of the inactive regions.

Example 8 includes the subject matter of Examples 6-7, wherein the cube representation is based on one or more of a hemisphere cube map format (HCMF) format and a hemisphere equiangular cube map (HEAC) format, wherein a hemisphere is less than a full sphere and is represented by one full face and four half faces.

Example 9 includes the subject matter of Examples 6-8, wherein the one or more processors co-located on a common semiconductor package include one or more of a central processing unit and a graphics processing unit.

Some embodiments pertain to Example 10 that includes a method facilitating facilitate hemisphere cube map projection format imaging environments, the method comprising: capturing, by a camera coupled to one or more processors, an image having image content, wherein the image content being represented by the image is omnidirectional such that the image content is mapped on a sphere while representing less than the sphere; mapping the image to a cubic representation based on six faces of a cube, wherein one or more of the six faces are classified as inactive regions such that they remain unoccupied or partially occupied; and arranging, based on the cubic representation, the six faces in a compact representation by avoiding inclusion of the inactive regions.

Example 11 includes the subject matter of Example 10, wherein the six faces are arranged in a single row and include one full face and four partial faces.

Example 12 includes the subject matter of Examples 10-11, further comprising applying padding to one or more regions having valid neighboring regions represented on the sphere and avoid padding of other regions lacking one or more of the valid neighboring regions and offering partial spherical representation.

Example 13 includes the subject matter of Examples 11-12, wherein the cube representation is based on one or more of a hemisphere cube map format (HCMF) format and a hemisphere equiangular cube map (HEAC) format, wherein a hemisphere is less than the sphere and is represented by one full face and four half faces, wherein the padding is further applied to the hemisphere.

Example 14 includes the subject matter of Examples 11-13, further comprising encoding the arrangement using a video encoder and communicate the encoded arrangement over to a computing device via one or more networks, wherein the one or more processors co-located on a common semiconductor package include one or more of a central processing unit and a graphics processing unit.

Some embodiments pertain to Example 15 that includes a data processing system comprising memory; and one or more processors coupled to the memory, the one or more processors to: capturing, by a camera, an image having image content, wherein the image content being represented by the image is omnidirectional such that the image content is mapped on a sphere while representing less than the sphere; mapping the image to a cubic representation based on six faces of a cube, wherein one or more of the six faces are classified as inactive regions such that they remain unoccupied or partially occupied; and arranging, based on the cubic representation, the six faces in a compact representation by avoiding inclusion of the inactive regions.

Example 16 includes the subject matter of Example 15, wherein the six faces are arranged in a single row and include one full face and four partial faces.

Example 17 includes the subject matter of Examples 15-16, wherein the one or more processors to apply padding to one or more regions having valid neighboring regions represented on the sphere and avoid padding of other regions lacking one or more of the valid neighboring regions and offering partial spherical representation.

Example 18 includes the subject matter of Examples 15-17, wherein the cube representation is based on one or more of a hemisphere cube map format (HCMF) format and a hemisphere equiangular cube map (HEAC) format, wherein a hemisphere is less than the sphere and is represented by one full face and four half faces, wherein the padding is further applied to the hemisphere.

Example 19 includes the subject matter of Examples 15-18, wherein the one or more processors to encode the arrangement using a video encoder and communicate the encoded arrangement over to a computing device via one or more networks, wherein the one or more processors co-located on a common semiconductor package include one or more of a central processing unit and a graphics processing unit.

Some embodiments pertain to Example 20 that includes an apparatus facilitating facilitate hemisphere cube map projection format imaging environments, the apparatus comprising: means for capturing, by a camera coupled to one or more processors, an image having image content, wherein the image content being represented by the image is omnidirectional such that the image content is mapped on a sphere while representing less than the sphere; means for mapping the image to a cubic representation based on six faces of a cube, wherein one or more of the six faces are classified as inactive regions such that they remain unoccupied or partially occupied; and means for arranging, based on the cubic representation, the six faces in a compact representation by avoiding inclusion of the inactive regions.

Example 21 includes the subject matter of Example 20, wherein the six faces are arranged in a single row and include one full face and four partial faces.

Example 22 includes the subject matter of Examples 20-21, further comprising means for applying padding to one or more regions having valid neighboring regions represented on the sphere and avoid padding of other regions lacking one or more of the valid neighboring regions and offering partial spherical representation.

Example 23 includes the subject matter of Examples 20-22, wherein the cube representation is based on one or more of a hemisphere cube map format (HCMF) format and a hemisphere equiangular cube map (HEAC) format, wherein a hemisphere is less than the sphere and is represented by one full face and four half faces, wherein the padding is further applied to the hemisphere.

Example 24 includes the subject matter of Examples 20-23, further comprising means for encoding the arrangement using a video encoder and communicate the encoded arrangement over to a computing device via one or more networks, wherein the one or more processors co-located on a common semiconductor package include one or more of a central processing unit and a graphics processing unit.

Example 25 includes at least one non-transitory or tangible machine-readable medium comprising a plurality of instructions, when executed on a computing device, to implement or perform a method as claimed in any of claims or examples 6-14.

Example 26 includes at least one machine-readable medium comprising a plurality of instructions, when executed on a computing device, to implement or perform a method as claimed in any of claims or examples 6-14.

Example 27 includes a system comprising a mechanism to implement or perform a method as claimed in any of claims or examples 6-14.

Example 28 includes an apparatus comprising means for performing a method as claimed in any of claims or examples 6-14.

Example 29 includes a computing device arranged to implement or perform a method as claimed in any of claims or examples 6-14.

Example 30 includes a communications device arranged to implement or perform a method as claimed in any of claims or examples 6-14.

Example 31 includes at least one machine-readable medium comprising a plurality of instructions, when executed on a computing device, to implement or perform a method or realize an apparatus as claimed in any preceding claims.

Example 32 includes at least one non-transitory or tangible machine-readable medium comprising a plurality of instructions, when executed on a computing device, to implement or perform a method or realize an apparatus as claimed in any preceding claims.

Example 33 includes a system comprising a mechanism to implement or perform a method or realize an apparatus as claimed in any preceding claims.

Example 34 includes an apparatus comprising means to perform a method as claimed in any preceding claims.

Example 35 includes a computing device arranged to implement or perform a method or realize an apparatus as claimed in any preceding claims.

Example 36 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An encoder comprising:
   first circuitry to:
   map a hemispherical image to a hemisphere cubemap, the hemisphere cubemap consisting of one rectangular full face and first, second, third, and fourth rectangular half faces, the one rectangular full face and the first, second, third, and fourth rectangular half faces representing a same hemisphere, the first rectangular half face being a first portion of a first rectangular full face, the second rectangular half face being a second portion of a second rectangular full face, the third rectangular half face being a third portion of a third rectangular full face, the fourth rectangular half face being a fourth portion of a fourth rectangular full face, wherein the first rectangular full face, the second rectangular full face, the third rectangular full face, and the fourth rectangular full face are distinct from each other; and
   arrange the one rectangular full face and the four rectangular half faces into a one dimensional arrangement of data, the one dimensional arrangement of data including, in order, the first rectangular half face, the second rectangular half face, the rectangular full face, the third rectangular half face, and the fourth rectangular half face; and
   encode a message including the hemisphere cubemap; and
   second circuitry to output the message.

2. The encoder of claim 1, wherein at least two of the four rectangular half faces are rotated.

3. The encoder of claim 1, wherein the first circuitry is to apply padding intermediate the first rectangular half face and the second rectangular half face.

4. The encoder of claim 1, wherein the hemisphere cubemap is based on one or more of a hemisphere cube map format (HCMF) format and a hemisphere equiangular cube map (HEAC) format.

5. The encoder of claim 1, wherein the first circuitry and the second circuitry are co-located on a common semiconductor package and include one or more of a central processing unit and a graphics processing unit.

6. A method comprising:
   mapping a hemispherical image to a hemisphere cubemap, the hemisphere cubemap consisting of one rectangular full face, a first rectangular half face, a second rectangular half face, a third rectangular half face, and a fourth rectangular half face, the one rectangular full face and the first, second, third, and fourth rectangular half faces representing a same hemisphere, the first rectangular half face being a first portion of a first rectangular full face, the second rectangular half face being a second portion of a second rectangular full face, the third rectangular half face being a third portion of a third rectangular full face, the fourth rectangular half face being a fourth portion of a fourth rectangular full face, wherein the first rectangular full face, the second rectangular full face, the third rectangular full face, and the fourth rectangular full face are distinct from each other;
   arranging, by executing an instruction with a processor, the one rectangular full face and the four rectangular half faces into a one dimensional arrangement of data, the one dimensional arrangement of data including, in order, first rectangular half face, the second rectangular half face, the rectangular full face, the rectangular third half, and the fourth rectangular half face; and
   encoding a message including the hemisphere cubemap.

7. The method of claim 6, wherein at least two of the four rectangular half faces are rotated.

8. The method of claim 6, further including applying padding intermediate the first rectangular half face and the second rectangular half face.

9. The method of claim 6, wherein the hemisphere cubemap is based on one or more of a hemisphere cube map format (HCMF) format and a hemisphere equiangular cube map (HEAC) format.

10. The method of claim 6, wherein the encoding of the message is implemented using a video encoder, wherein the video encoder and the processor are co-located on a common semiconductor package including one or more of a central processing unit and a graphics processing unit.

11. At least one non-transitory machine-readable medium comprising instructions which, when executed by a machine, cause the machine to at least:
    map a hemispherical image to a hemisphere cubemap, the hemisphere cubemap consisting of one rectangular full face, a first rectangular half face, a second rectangular half face, a third rectangular half face, and a fourth rectangular half face, the one rectangular full face and the first, second, third, and fourth rectangular half faces representing a same hemisphere, the first rectangular half face being a first portion of a first rectangular full face, the second rectangular half face being a second portion of a second rectangular full face, the third rectangular half face being a third portion of a third rectangular full face, the fourth rectangular half face being a fourth portion of a fourth rectangular full face, wherein the first rectangular full face, the second rectangular full face, the third rectangular full face, and the fourth rectangular full face are different from each other;
    arrange the one rectangular full face and the four rectangular half faces into a one dimensional arrangement of data, the one dimensional arrangement of data including, in order, the first rectangular half face, the second rectangular half face, the rectangular full face, the third rectangular half face, and the fourth rectangular half face; and
    encode a message including the hemisphere cubemap.

12. The at least one non-transitory machine-readable medium of claim 11, wherein at least two of the four rectangular half faces are rotated.

13. The at least one non-transitory machine-readable medium of claim 11, wherein the instructions, when executed, further cause the machine to apply padding intermediate the first rectangular half face and the second rectangular half face.

14. The at least one non-transitory machine-readable medium of claim 11, wherein the hemisphere cubemap is based on one or more of a hemisphere cube map format (HCMF) format and a hemisphere equiangular cube map (HEAC) format.

15. The at least one non-transitory machine-readable medium of claim 11, wherein the instructions, when executed, cause the machine to encode the message using a Video encoder.

16. An apparatus comprising:
memory;
instructions in the apparatus;
at least one processor to execute the instructions to cause the at least one processor to at least:
 map a hemispherical image to a hemisphere cubemap, the hemisphere cubemap consisting of one rectangular full face, a first rectangular half face, a second rectangular half face, a third rectangular half face, and a fourth rectangular half face, the one rectangular full face and the first, second, third, and fourth rectangular half faces representing a same hemisphere, the first rectangular half face being a portion of a first rectangular full face, the second rectangular half face being a portion of a second rectangular full face, the third rectangular half face being a portion of a third rectangular full face, the fourth rectangular half face being a portion of a fourth rectangular full face, wherein the first rectangular full face, the second rectangular full face, the third rectangular full face, and the fourth rectangular full face correspond to different faces of a cube represented, at least in part, by the hemisphere cub emap;
 arrange the one rectangular full face and the four rectangular half faces into a one dimensional arrangement of data, the one dimensional arrangement of data including, in order, the first rectangular half face, the second rectangular half face, the rectangular full face, the third rectangular half face, and the fourth rectangular half face; and
 encode a message including the hemisphere cubemap.

17. The apparatus of claim 16, wherein at least two of the four rectangular half faces are rotated.

* * * * *